Sept. 11, 1956
R. K. SHEWMON
2,762,900
MOTOR CONTROL DEVICE
Filed Nov. 22, 1952
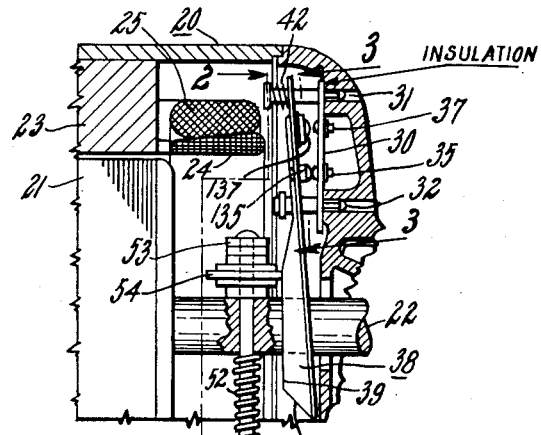
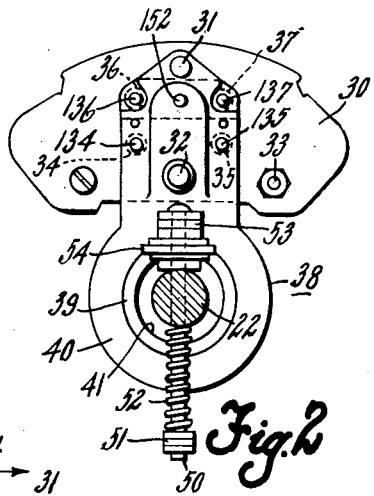
INVENTOR.
RALPH K. SHEWMON
BY
Willits, Hardman and Fehr
ATTORNEYS

United States Patent Office 2,762,900
Patented Sept. 11, 1956

2,762,900
MOTOR CONTROL DEVICE

Ralph K. Shewmon, Dayton, Ohio, assignor to General Motors Corporation, Detroit, Mich., a corporation of Delaware Application November 22, 1952, Serial No. 322,021

4 Claims. (Cl. 219—39)

This invention relates to improvements in control devices and electric circuits involving electric motors having starting and running windings, and particularly to control devices and electric circuits adapted for use in controlling an electric motor and an electric heater of a drying apparatus in which a motor driven fan circulates air over the heater and through the drying apparatus.

In automatic clothes driers that are on the commercial market it is common practice to utilize a timing control to start and stop operation of the electric drier, including an electric motor for circulating air and an electric heater. It is becoming increasingly essential that the electric heater of such drier units be electrically connected in such a manner that the electric circuit is broken to both sides of the heater. This involves utilization of extra controls operated by the timer to effect the desired results.

It is also essential in automatically operated clothes drier units that the heating unit be connected to a source of power only when the motor of the air circulating unit is operating. This again has required interlocking of the controls to secure the results.

In my copending application, Serial No. 171,583, filed July 1, 1950, now Pat. No. 2,623,979, there is disclosed an electric circuit and switching controls operated in a manner by which an electric switch in a motor having starting and running winding is used for the purpose of controlling electric connection to another electrically operated unit, such as an electric heater. The circuit of the aforesaid application eliminates the necessity of using extraneous controls to insure operation of the electric heater only when the air circulating motor is operating above a predetermined speed, that is, operating at normal speed.

The invention herein constitutes an improvement over that of my aforesaid application in that the motor operated switching device and the usual time control provided in an automatic clothes drier are arranged electrically to provide for opening electric circuit to both sides of the heater unit, thereby rendering the heater unit completely disconnected from any live power source during inactivity of the drier unit.

It is, therefore, an object of the present invention to provide an automatic control for an apparatus such as a clothes drying machine wherein the control apparatus will render the heating coil of the clothes drying machine active and the starting winding of the motor ineffective so long as the motor operates at its normal speed, and wherein the control renders the heating coil inactive and the starting winding effective when the speed of the motor drops below a predetermined speed, the controls breaking electric circuit to both sides of the heating unit at any time the clothes drier is inactive.

Further objects and advantages of the present invention will be apparent from the following description, reference being had to the accompanying drawings wherein a preferred embodiment of the present invention is clearly shown.

In the drawings:

Fig. 1 is a fragmentary cross sectional view of an electric motor incorporating the switching device used in the present invention;

Fig. 2 is a view taken along the line 2—2 of Fig. 1;

Fig. 3 is a fragmentary view taken along the line 3—3 of Fig. 1;

Fig. 4 is a cross sectional view taken along the line 4—4 of Fig. 3;

Fig. 5 is a cross sectional view taken along the line 5—5 of Fig. 3;

Fig. 6 is a diagrammatic view illustrating the electric circuit connecting the elements of a drying apparatus.

The control device of the electric motor disclosed in the present invention is of the general type illustrated in a patent to C. J. Werner 2,182,977, issued December 12, 1939. In the present invention it performs a dual function, first it controls the starting winding of the electric motor, rendering said winding effective only for starting purposes and ineffective when the motor has reached and is operating at a predetermined speed, and second it renders the heating coil of the drying machine in which the motor is used, ineffective while the motor is operating below proper speed or is completely stopped and effective only when the motor is operating at the proper predetermined speed to drive the circulating fan.

Referring to the drawings, the motor 20 has a rotor 21 carried by shaft 22, and a stator 23 provided with running winding 24 and starting winding 25. The shaft 22 of the motor 20 is attached to and drives a fan 26 for circulating heated air in the drying machine in which the motor is used.

The control device comprises an insulating base plate 30 secured in the motor by pins 31 and 32 insulated from the motor housing in any suitable manner. The plate 30 has a neutral terminal post 33 adapted for connection to the neutral line of a suitable source of power. Four stationary contacts 34, 35, 36 and 37 are carried by the plate 30. These contacts are so arranged that contact 34 will align and be engageable by contact 134 and contact 35 will be engageable by the contact 135 on the movable bridging member 38 that is constructed of metal whereby to provide bridging means between contacts 34 and 35 when closed upon the contacts as illustrated in Fig. 1. Contact 36 is engageable by a contact 136 and contact 37 by a contact 137 carried on a bridging member or means 150 electrically isolated from the bridging member 38 whereby circuit is made between contacts 36 and 37 when the bridging member 150 closes upon the contacts.

The bridging member 150 comprises a bar carried on the upper end of the member 38 and supported on an insulating strip 151 by the contacts 136 and 137. The insulating strip 151 is secured to the upper end of the member 38 by the rivet pin 152. The member 38 has openings 153 around the ends of the contacts 136 and 137 to prevent engagement therewith and the bridging bar 150 has an opening 154 around the rivet pin 152. The openings 153 and 154 together with the insulating strip 151 effectively electrically isolate the bridging bar 150 from the bridging member 38. This provides for control of a completely independent electric circuit through the pair of contacts 36 and 37 when closed by the bridging member 150.

The end of movable bridging member 38 of the switch, opposite the flat end upon which contact points 134, 135, 136 and 137 are attached is disc-shaped and dished providing a flat portion 39 and a conical portion 40. The flat portion is apertured as at 41, the motor shaft 22 extending through said aperture when the switch is assembled in the motor housing, the aperture being substantially larger in diameter than the shaft to assure free movement of the member 38 and avoid any grounding contact of it with said shaft. A spring 42 is interposed between the head of pin 31 and the member 38, said spring constantly urging member 38 to move clockwise (Fig. 1) about either of the pair of engaging contacts 36—136 or 37—137 when acting as the fulcrum. Pin 32, also insulated from the motor housing in which it is anchored, extends through an aperture in member 38 and has a head portion which engages member 38 to limit its movement under the influence of spring 42.

The motor driven mechanism for actuating member 38 comprises a rod 50, slidably extending through a transverse opening in the shaft 22, one end of rod 50 having a head 51. A spring 52, surrounding rod 50 engages the head 51 and shaft 22, yieldably urging the inner of a series of weight washers 53, immovably secured to rod 50 on the side of shaft 22 opposite spring 52, against said shaft: a washer 54, substantially larger in diameter than the washers between which it is clamped, is made of any suitable fibrous material such as felt or the like, and is engaged constantly by the dish-shaped, disc portion of the member 38 under the pressure of spring 42. As shown in Fig. 1, when the motor is not operating, the centrifugal mechanism and particularly felt washer 54 is engaged by the flat annular face 39 of member 38, thus member 38, pivoted about engaging contacts 34—134 and 35—135 compresses spring 42 and contacts 136—137 are disengaged from their respective cooperating stationary contacts 36—37.

When the motor starts to operate and rotate the centrifugal mechanism mounted on shaft 22, the weights 53 on rod 50 will move radially outwardly due to centrifugal force and against the effect of spring 52 and thus member 38 may rotate clockwise about contacts 34—134 and 35—135 acting as the fulcrum, under the effect of spring 42. At a predetermined motor speed the felt washer reaches a point in its outward movement away from shaft 22 at which it rides a low line engagement on the sloping face 40 of member 38. Now contacts 36—136 and 37—137 will engage and contacts 34—134 and 35—135 separate, the former set of contacts now acting as the fulcrum for further clockwise movement of member 38. A decrease in motor speed below a predetermined operating speed and a consequent decrease of centrifugal force permits spring 52 to move felt washer 54 toward shaft 22 and thus the felt washer, in constant contact with sloping face 40 of member 38 as said motor shaft rotates, forces the member 38 counterclockwise about the fulcrum 36—136 and 37—137 until contacts 34—134 and 35—135 again engage, at which time 36—136 and 37—137 are separated and 34—134 and 35—135 act as fulcrum for further counterclockwise movement of the member 38.

The control device just described is used on an electric motor having starting and running windings, both of which are energized for motor starting purposes but only one of which, the running winding, is utilized for normal motor operation. The motor drives an air circulating fan 26 in a drying machine as for instance a laundry drier in the drying compartment of which there is provided an electrically energized heater coil 60. Coil 60, when energized, heats the air in the drier compartment and the motor driven fan 26 circulates it so that all laundry within the compartment is equally subjected to the heated air. If, for any reason, the fan operating motor should fail, air circulation would stop and continued operation of the heater coil 60 under such circumstances would prove disastrous and extremely dangerous not only to the laundry within the drier but might also threaten damage to the building in which the drier is operating.

Fig. 6 discloses diagrammatically the various elements of an installation of this kind and their electrical connections. Substantially all elements excepting the main, manual control switch are contained within the heating compartment of the drier, which may be of any suitable design or construction and therefore is not illustrated here.

The master switch designated as a whole by the numeral 65 is of any suitable type purchasable on the open market. Briefly, it comprises two normally open switches 66 and 67, operated simultaneously by a control knob 68 which is combined with an automatic timer operable to cause swtiches 66 and 67 to remain closed for any desired period of time and then automatically be opened.

One side of each switch 66 and 67 is connected to one side 70 of a 230 volt power line, the other side 71 of the power line being connected to the terminal for contact 36. The other side of the main switch 66 is connected to an adjustable thermostat 73 of any suitable design. The thermostat 73 in turn is connected to an electric heater 60 which in turn is connected to a protective fuse 72, the ultimate connection being with the contact terminal 37.

By placing the electric heater 60 between the master switch 65 and the contacts 36 and 37 of the control device electric circuit is broken to both sides of the heater 60 when the drier unit is inactive because at this time switch 66 will be open and the bridging member 150 will be disengaged from contacts 36 and 37, as shown in Fig. 1. Thus, without utilizing any extraneous equipment other than that normally used for controlling the starting winding of the electric motor and the timer for automatically controlling the time cycle of the drying machine the circuit to both sides of the heating unit 60 can be broken.

The other side of switch element 67 of the manually operable master switch 65 is connected to a neutral line 74 of substantially 115 volts. Connected in this line there may be a germicidal lamp 75 and any suitable ballast element 76. The electric coil 77, controlling the operation of the automatic timer, is also connected to line 74, as is the terminal contact 35 of the automatic switch. One end of the running winding 24 of the motor 20 is connected to terminal contact 35 and one end of starting winding 25 is connected to the terminal contact 34. The other ends of said running and starting windings 24 and 25 respectively, are connected together and to the terminal post 33 of the automatic switch. This post is electrically connected with the neutral line 74.

To render the electric motor inoperative in case of abnormal current condition caused by overload, stalling or other abnormalities, a protective device 80 of any suitable design may be connected in the line between the master switch element 67 and the terminal contact 35 of the automatic switch this device being operative to break the circuit to the motor and render said motor completely inoperative and save it from damage which would result if the abnormality which causes the device to function were permitted to continue.

The entire control apparatus functions as follows: the degree of temperature at which the drier is to operate is set by adjusting the regulating thermostat 73. After the clothes to be dried are placed in the drying compartment, the element 68 is actuated which closes swtiches 66 and 67. For this particular instance 68 is set, let us say, for a 15 minute operating interval, which means that after 15 minutes have elapsed, the timer will operate automatically to open switches 66 and 67. Closing contact 67 connects line 70 with terminal contact 35 through the protective device 80. The inactive motor will have its centrifugal device in the position as shown in Fig. 1 in which the switch bridging member 38 has its contact points 135 and 134 in engagement with terminal contacts 35 and 34 respectively. Thus current from switch 67 flows from terminal contact 35, its engaging contact point 135 through the member 38, contact point 134 and its engaging contact terminal 34. From terminal 35 current flow through the running winding 24 directly connected with said terminal and from terminal 34 current flows through the starting winding 25. Both these windings being connected to terminal post 33 and it to the line 74 will have circuit completed to energize both windings 24 and 25 whereby the motor is activated and caused to rotate. During this time of motor starting it will be noted that contact terminals 36 and 37 are not connected together or bridged and thus the circuit through the heater coil 60 is still open. As the speed of the motor increases the centrifugal device including shaft or rod 50 and its weights 53 and fibrous washer 54 are moved radially outwardly of the motor shaft, thus the washer 54, moving over the declining surface 40 permits spring 42 to actuate member 38 clockwise, as regards Fig. 1, when the motor reaches a predetermined operating speed the fibrous washer 54 will have reached a rotary path of travel at which the spring 42 will have moved member 38 about contacts 34—134 and 35—135 as fulcrum to cause engagement of contacts 36—136 and 37—137 which, now acting as fulcrum cause the member 38 to lift its contact points 134—135 out of engagement with their respective cooperating stationary contact terminals 34 and 35 and thereby breaking the circuit between switch 67 and the terminal contact 34. This renders the starting winding de-energized and ineffective and also completes the circuit between switch 66 and the heater coil 60 causing energization of said coil. The running winding 24, not having the automatic switch in circuit therewith, will not be affected by its operation from one position to the other. Only the operation of the manual master switch element 67 or the protective device 80 in case of abnormal conditions controls the running winding 24.

If, at any time, the speed of the electric motor decreases before the proper operating rate, the centrifugal switch including the felt washer 54 will actuate the member 38 to open contact engagement between contacts 36—136 and 37—137 to break the circuit including the heater coil 60 and render it inoperative. This, therefore, prevents damage from overheating or rather concentration of heated air which occurs when the heater coil is permitted to function when the motor fails to drive the air circulating fan in the proper manner.

The protective device 80 may be provided to eliminate recurrent on and off operations of the motor when abnormal conditions do not permit it to function at predetermined operating speeds under the control of the automatic, centrifugally actuated switch. Device 80 when rendered effective by abnormal conditions breaks the motor circuit and renders the motor completely inoperative until reset, which should not be done until the cause of the abnormal operation is removed.

From the aforegoing it will be seen that a drying machine, equipped with the present control mechanism, is completely protected against damage to itself or to its contents inasmuch as the heat producing element thereof can not function while the motor is at rest or while it is operating at a speed below the required speed properly and safely to circulate the heated air within the heated chamber. When the motor reaches proper operating speed the heater is rendered effective and when the speed of the motor drops below a predetermined rate for any cause whatsoever, the heater is rendered inactive.

Also, it will be apparent that when the drying machine is inactive that the bridging member 150 is disengaged from contacts 36 and 37 and switch 66 being opened by the timer, both sides of the heater 60 are disengaged from any connection with an active electric line.

While the embodiment of the present invention as herein disclosed, constitutes a preferred form, it is to be understood that other forms might be adopted, all coming within the scope of the claims which follow.

What is claimed is as follows:

1. In combination for multi-voltage electric circuit connection, electric power supply conductor means providing for connection to a multi-voltage source, an electric motor operative on a first voltage potential and having starting and running winding circuits, a second electric power consuming device operative on a second and different voltage potential concurrently only with operation of said motor, a circuit controller including a switch in series connection between one side of said second device and a first power supply conductor, a motor speed sensitive switch device on said motor having one set of normally closed contacts in series circuit connection with said first conductor and said starting winding and a second conductor and in parallel circuit connection with said running winding circuit and said first and second conductors to provide circuit for a first voltage potential applied to said winding, said motor speed sensitive switch device having a second set of normally open contacts in series connection with said first conductor said second device and a third conductor and electrically isolated from said first set of contacts to provide circuit for a second and different voltage potential applied on said second device independent of said first mentioned circuit, and a motor actuated speed responsive device operative to open said first mentioned circuit concurrently with closing of said second mentioned circuit when the motor operates at or above a predetermined speed.

2. In combination with an electric heater, of a fan motor having starting and running windings, a spring loaded switch in circuit with both said heater and starting winding and having one set of normally closed contacts in series circuit with said starting winding on one voltage potential and a second set of normally open contacts in series circuit with said heater on a second and different voltage potential and electrically isolated from the first set of contacts yieldably urged to effect closure of the heater circuit and opening of the starting winding circuit; and a motor driven switch controlling device operative at motor speeds below a predetermined rate to provide for positioning of said switch in heater circuit open position and starting winding closed position and to yieldably urge the switch to close the heater circuit and open the starting winding circuit concurrently when the motor attains and while it operates at a predetermined speed.

3. In combination with an electric heater unit, of a fan motor having starting and winding circuits, a switch consisting of stationary and movable contacts, one pair of contacts being in the motor starting winding circuit to carry one voltage potential and the other pair of contacts being in the heater unit circuit and elecrically isolated from the first pair of contacts to carry a second and different voltage potential, a spring yieldably urging the movable contacts of the said pairs of contacts with one of them moving into engagement with a stationary contact in the heater circuit and the other out of engagement with the stationary contact in the starting winding circuit with momentary overlap of simultaneous engagement of all contacts; a motor speed responsive device driven by the motor, said device engaging the movable contacts to hold them in position in opposition to said spring with one of the movable contacts engaging the stationary contact of the starting winding circuit and the other of the movable contacts out of engagement with the stationary contact of the heater circuit while the motor is inactive or is operating below a predetermined speed.

4. In combination with an electric heat unit of a fan motor having starting and running windings, a pair of stationary contacts in the circuit of the starting winding and a second pair of stationary contacts in the circuit of the heating unit, a movable bridging element having one set of contacts thereon electrically connected through the bridging element and a second set of contacts electrically isolated from the bridging element and provided with bridging means connecting the said second set of contacts, said bridging element being tiltable into one position to effect bridging of the first pair of stationary contacts by the first pair of contacts on the bridging element and into a second position to bridge the second pair of stationary contacts with the second pair of contacts on the bridging element, a spring yieldably urging the bridging element to bridge the second pair of stationary contacts with the second pair of contacts on said bridging element to bridge the heating unit circuit, a centrifugal device driven by the motor constantly engaging the bridging element and operative to oppose the spring whereby at speeds of the motor below a predetermined rate said bridging element is positioned to maintain the heating unit circuit completely open and the running winding circuit completely closed, and when the motor is operating at a predetermined rate permits the spring to become effective to close the heating unit circuit and open the starting winding circuit simultaneously but with momentary overlap of simultaneous engagement of all contacts.

References Cited in the file of this patent

UNITED STATES PATENTS

| | | |
|---|---|---|
| 1,926,537 | Hoffman | Sept. 12, 1933 |
| 1,998,916 | Young et al. | Apr. 23, 1935 |
| 2,050,332 | Jordan | Aug. 11, 1936 |
| 2,196,005 | Bariffi | Apr. 2, 1940 |
| 2,248,959 | Christman et al. | July 15, 1941 |
| 2,260,233 | Ripley | Oct. 21, 1941 |
| 2,564,868 | Weber et al. | Aug. 21, 1951 |
| 2,623,979 | Shewmon | Dec. 30, 1952 |